United States Patent [19]

Musick

[11] Patent Number: 4,479,295

[45] Date of Patent: Oct. 30, 1984

[54] METHOD AND APPARATUS FOR MANUFACTURING DISCRETE LAYERED ARTICLES FROM A CONTINUOUS WEB

[75] Inventor: Carroll Musick, Erwin, Tenn.

[73] Assignee: Erwin Welding & Machine, Inc., Erwin, Tenn.

[21] Appl. No.: 248,486

[22] Filed: Mar. 27, 1981

[51] Int. Cl.³ .......................... B23P 17/00; B41L 1/32

[52] U.S. Cl. .................................. 29/417; 29/419 R; 270/39

[58] Field of Search ....................... 29/417, 419; 83/42, 83/869, 875, 877, 878; 270/39

[56] References Cited

U.S. PATENT DOCUMENTS

| | | | |
|---|---|---|---|
| 946,393 | 1/1910 | Nichols . | |
| 2,049,135 | 7/1936 | Peyser | 83/42 |
| 2,420,525 | 5/1947 | Deloye . | |
| 2,449,663 | 9/1948 | Marcalus . | |
| 2,672,896 | 3/1954 | Shurtliff | 83/878 |
| 2,800,932 | 7/1957 | Scott | 83/878 |
| 3,717,335 | 2/1973 | Faltin . | |
| 3,744,360 | 7/1973 | Currie et al. | 83/23 |
| 3,768,349 | 10/1973 | Cauffiel | 83/42 |
| 3,868,809 | 3/1975 | Bledsoe . | |
| 4,054,283 | 10/1977 | Rayfield . | |

FOREIGN PATENT DOCUMENTS

| | | | |
|---|---|---|---|
| 31493 | 5/1976 | Australia | 83/877 |
| 1905315 | 2/1969 | Fed. Rep. of Germany | 83/877 |

*Primary Examiner*—Ervin M. Combs
*Assistant Examiner*—Steven E. Nichols
*Attorney, Agent, or Firm*—Luedeka & Neely

[57] ABSTRACT

A method and apparatus are provided for manufacturing a plurality of discrete layered articles having a non-rectangular cross-sectional shape from a web of batting of indeterminate length. The web is fed into an oscillating chute to define a plurality of layers. A continuous notch is defined in the layers to define a non-rectangular cross-sectional shape. A predetermined portion of the notched layers is separated from the following layers and secured to define a discrete article.

13 Claims, 4 Drawing Figures

METHOD AND APPARATUS FOR MANUFACTURING DISCRETE LAYERED ARTICLES FROM A CONTINUOUS WEB

The present invention relates to a method and apparatus for manufacturing discrete layered articles from a continuous web of batting and more particularly for manufacturing layered articles having a non-rectangular cross-sectional shape.

It has been found desirable to insulate commercial furnaces and ovens, for example, with ceramic fibers rather than firebrick. The ceramic fibers are light, substantially less expensive than firebrick and last for greater periods of time. Ceramic fibers are manufactured for insulation in the form of elongated webs of batting. The webs are stored and transported in rolls. However, in order to apply the batting to the interior surfaces of a furnace or oven, the batting, which is essentially two-dimensional, is formed into three-dimensional modules having a shape generally comparable to that of a firebrick. In one type of module, the shape is designed for overlapped mounting on a furnace wall. One embodiment of a module has an overall length of fourteen inches, height of twelve inches and depth of six inches. In order to mount the modules to a furnace surface in a mating overlapping manner, two diagonally opposing longitudinal edges are notched. That is, two opposing notches, each having a height of about two inches and a depth of about three inches, are defined along diagonally opposing edges of the module to permit overlapping engagement of adjacent modules while maintaining a generally planar exposed surface.

Heretofore, ceramic batting modules have been constructed from webs of ceramic batting on an essentially manual basis. In the manual process, a length of ceramic batting sufficient for one module is cut from a rolled continuous web. The cut length of batting is then folded and compressed in a zigzag manner into a first box having interior dimensions equivalent to the outer dimensions of the finished module. The folded web is then removed from the first box and deposited into a second box which has been previously lined with a length of flexible nylon mesh. The mesh is then wrapped around the folded batting to overlap itself. The mesh is pinned to the batting to maintain its position on the compressed batting and glued to itself in the overlapped region. The wrapped module is then removed from the second box and placed into a third box which includes notched edges corresponding to the locations of the desired notches in the modules. The third box is then used as a jig to cut the desired notches in the module with a band saw. Employing the above-described manual process, a single person can manufacture an average of about two modules per hour. Thus, the labor involved in the manufacture of a ceramic batting module is substantial. Also, there is a substantial variance in the dimensions of finished modules.

It is therefore an object of the present invention to provide a method and apparatus for forming a continuous web of batting into a plurality of discrete, shaped modules. It is also an object to provide a method and apparatus for manufacturing substantially identical ceramic batting modules at speeds in excess of ninety modules per hour with a minimal amount of labor. Further objects and advantages will be apparent when the following description is considered in connection with the accompanying drawings in which.

Figure 1:
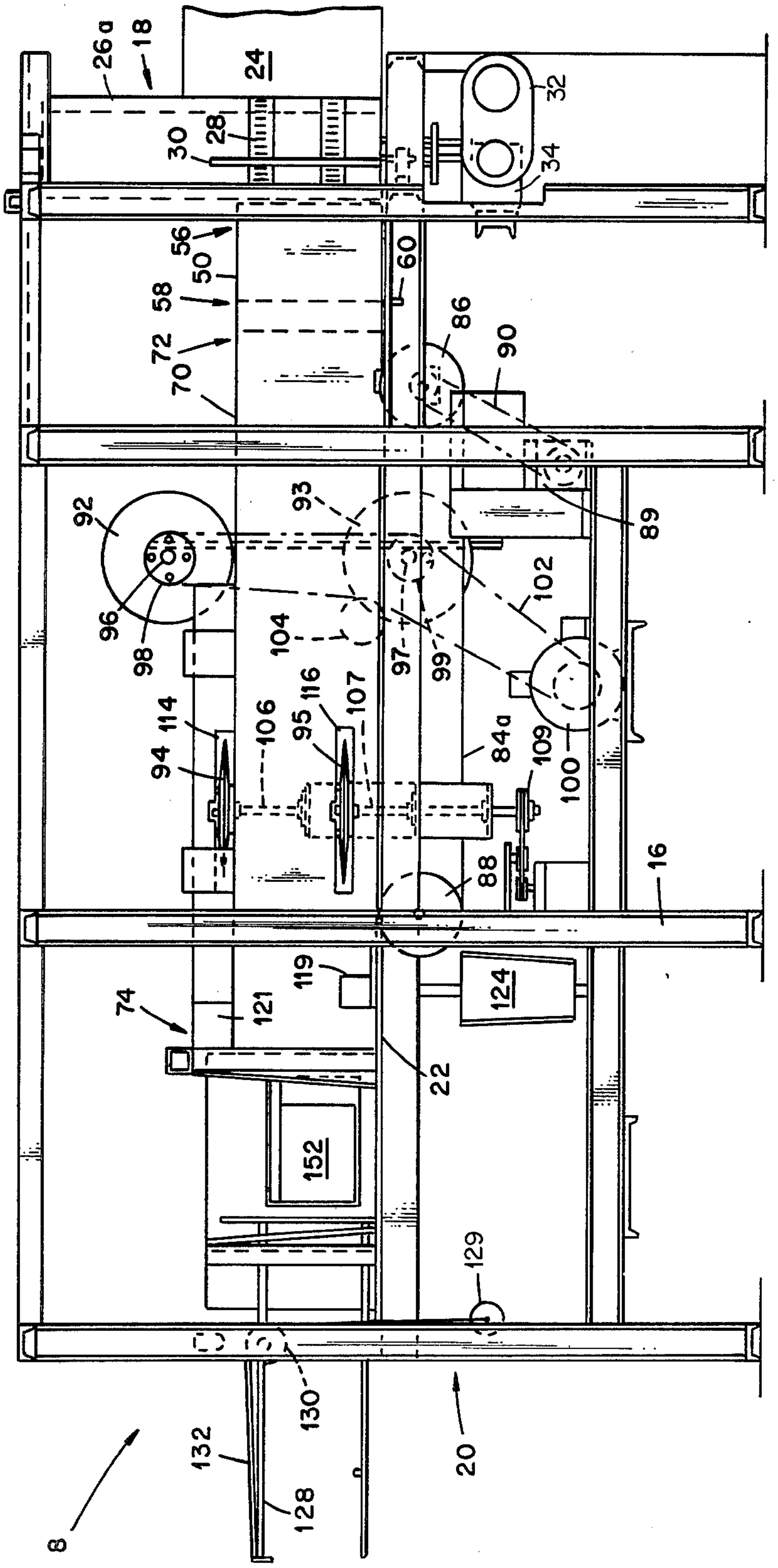
FIG. 1 is a front elevational view of an apparatus embodying various of the features of the present invention.
Figure 2:
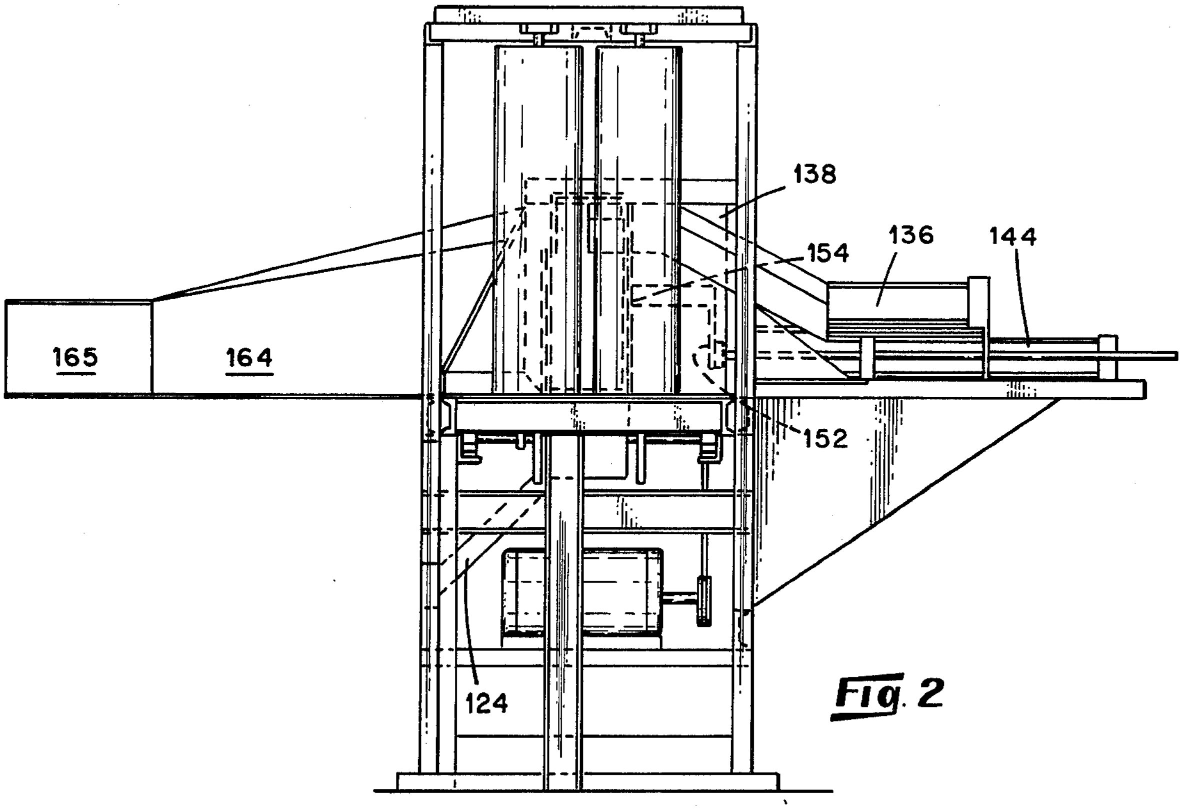
FIG. 2 is a right side elevational view of the apparatus depicted in FIG. 1.

Generally in accordance with the present invention, an elongated web of batting is fed into a layering station 10, comprising a pair of adjacent feed rollers and a laterally oscillating chute, to form successive layers of ceramic batting. The layers of batting are carried from the oscillating chute of the layering station through a shaping station 12 wherein circular saws cut continuous notches from the layered batting and the scrap material is removed from the notched, layered batting. The notched, layer batting is then urged forwardly to a segmenting station 14 wherein successive portions of the notched, layered batting are separated and discharged from the apparatus for banding as discrete modules.

referring more particularly to the drawings, the apparatus 8 shown in the drawings includes an elongated main frame 16 having an entry end 18 and an opposing discharge end 20. The frame 16 is of fabricated construction having a series of suitable support legs, longitudinal members and cross pieces which are connected together. The upper longitudinal members and their associated cross pieces support and in part constitute the elongated platform 22 upon which the various operations are performed.

A roll of ceramic fiber batting 24 of indeterminate length is mounted for free rotation about a vertical axis adjacent to the entry end 18 of the frame 16 at the level of the level of the platform 22. In the depicted embodiment the batting is about sixteen inches wide and about one and one quarter inch in thickness.

A pair of rotationally driven, cylindrical rollers **26*a* and 26*b* are journaled in bearings mounted on the frame 16 in a vertical orientation at the entry end 18, laterally spaced apart by a distance of about one inch. Each of the rollers 26*a* and 26*b* is about seven inches in diameter and about thirty-six inches long. Two circumferential bands of ribs 28 are defined on each of the rollers 26*a* and 26*b* to provide frictional engagement with the batting as it passes between the driven rollers. The bands of ribs 28 are interrupted at 180° intervals by a longitudinal nip bar 30. That is, each roller 26*a* and 26*b* carries two diameterically opposed nip bars 30, each of which extends to a height of about sixteen inches. The rollers 26*a* and 26*b* are rotationally offset by 90° so that a nip bar 30 from each roller is alternatingly located directly between the rollers 26*a* and 26*b*** as the rollers are driven in opposing directions of rotation.

The rollers **26*a* and 26*b* are driven by an electric motor and gear box 34. The gear box shaft 36 carries a pulley 38 which, through a drive belt 40, drives an idler pulley 42. The belt 40 also engages a pulley 44 mounted at the bottom of the roller 26*a* to drive the roller 26*a*. A second drive belt 46 extends from the idler pulley 42 to a pulley 48 mounted at the bottom of the roller 26*b*. The pulleys 44 and 48 have identical radii, whereby, the rollers 26*a* and 26*b* are simultaneously driven by the motor 32 at equivalent speeds of rotation. As the rollers 26*a* and 26*b* are rotated clockwise and counter-clockwise, respectively, the batting 24 is progressively fed between the rollers and into a laterally oscillating, layering chute 50**.

The layering chute 50 is generally U-shaped in lateral cross-section, including a base wall 52 and a pair of parallel side walls 54a and 54b, and has an entry end 56 and a discharge end 58. The base wall 52 is pivotally attached to the frame 16 with a pin 60 having a vertical pivotal axis adjacent the discharge end 58. The entry end 56 of the chute 50 is laterally oscillated, pivoting about the pin 60, by means of a connecting rod 62 which interconnects the entry end of the base wall 52 with a pulley 64 driven by a belt 66 from a pulley 68 carried by the roller 26b. A pin 63 pivotally attaches the rod 62 to the base wall 62 and a pin 65 pivotally attaches the rod 62 to the pulley 64. As the roller 26b is rotated by the belt 46, the belt 66 causes the pulley 64 to rotate. The connecting rod 62, which is pivotally attached at one end to the pulley 64 and at the other end to the chute 50, causes the entry end 56 of the chute 50 to move back and forth past the space defined between the rollers 26a and 26b. By varying the radial spacing of the pin 65 on the pulley 64, the oscillatory distance is changed and varying layer widths are produced.

Figure 4:
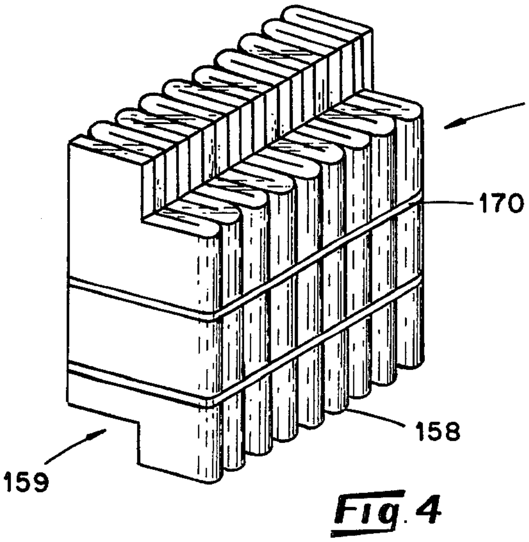
FIG. 4 is a perspective view of a module manufactured in the apparatus depicted in FIGS. 1–3.

Asthe chute 50 oscillates, and the batting 24 is driven between the rollers 26a and 26b, the batting 24 is layered in a serpentine or zigzag pattern as depicted in FIG. 4. The batting 24 is pushed through the chute 50 by the following incoming batting.

In the depicted embodiment, the nip bars 30 define periodic creases in the batting at intervals of about 5.5 inches as it is fed through the rollers 26a and 26b. It has been determined that although the creases aid in folding the batting, the oscillatory action of the chute 50 is usually sufficient to properly layer the batting in a zigzag pattern. However, in those cases in which it is desired to manufacture a module having individual layers of batting, in contrast to a serpentine fold, the nip bars 30 of each roller 26a and 26b may be sharpened and extended to engage the opposing roller. In this manner, individual lengths of batting are successively deposited into the chute 50.

The open discharge end 58 of the chute 50 extends into the entry end 72 of a stationary chute 70 of the shaping station 12. The chute 70, which is generally U-shaped in lateral cross-section, is defined by a base wall 76 and a pair of vertical side wall 78a and 78b. The side walls 78a and 78b are located on the outside of the side walls 54a and 54b, whereby the layered batting will not snag as it enters the chute 70. In the depicted apparatus, the base wall 76 is about six inches wide the side wall 78a is about twelve inches tall, and the side wall 78b about twelve inches tall adjacent the entry end 72 and about sixteen inches tall adjacent the discharge end 70. The chute 70 is about five feet long. For varying sizes of modules the size and spacing of the wall 76, 78a and 78b are adjusted accordingly.

A pair of spaced-part, rectangular apertures 80 and 82 are defined in the base wall 76 to permit passage of two endless belts 84a and 84b which are carried on a driven drum 86 and an idler drum 88. The drum 86 is driven by a 0.5 horsepower electric motor and gear box 89 through a belt 90. The belts 84a and 84b aid in urging the layered batting through the shaping chute 70.

Four circular saws 92, 94 and 95, each having a diameter of about twelve inches, extend into the chute 70 to cut continuous notches as the layered batting passes through the chute 70. The saws 92 and 93 are mounted on shafts 96 and 97, respectively, for continuous rotation about horizontal axes. The saws 92 and 93 are coplanar, defining a vertical plane which longitudinally bisects the chute 70. Each of the shafts 96 and 97 is journaled in bearings and carries a pulley 98 and 99, respectively. The pulleys 98 and 99 are driven by a two horsepower electric motor 100 through a belt 102 which engages the pulleys 98 and 99 and is maintained under tension by an idler pulley 104. The saw 92 extends about two inches downwardly into the layered batting and the saw 93 extends about two inches upwardly into the layered batting as it is carried through the shaping chute.

The saws 94 and 95 are mounted on shafts 106 and 107, respectively, for continuous rotation about vertical axes. Each of the shafts 106 and 107 is journaled in bearings and carries a pulley 108 and 109, respectively. The pulley 108 and 109 are driven by a five horsepower electric motor 110 through a belt 112. The saw 95 defines a plane which is two inches above the base wall 76 and extends through an aperture 114 defined in the side wall 78b. The saw 95 extends into the chute 70 by a distance of about three inches to intersect the vertical cut of the saw 93.

The saw 94 defines a plane which is fourteen inches above the base wall 76 and extends through an aperture 116 defined in the side wall 78a. The saw 94 extends into the chute 70 by a distance of about three inches to intersect the vertical cut of the saw 92. Thus, as the layered batting 24 is carried and pushed past the saws 92 and 93, two, two-inch vertical cuts are defined in the batting along the central vertical plane thereof. Then, as the layered batting continues past the saws 94 and 95, two, three-inch horizontal cuts are defined in the batting from opposing sides at heights of two inches and fourteen inches. Two continuous notches, each having dimensions of two inches by three inches, are thus defined at diagonally opposite corners of the layered batting. It will be recognized, however, that notches of varying sizes and shapes are made by varying the orientation and locations of the saws 92, 93, 94 and 95.

Adjacent the discharge end 74 of the chute 70, scoop means 118 and 120 extend inwardly from the side walls 78a and 78b, respectively, to the plane defined by the saws 92 and 93 to engage the cut portions of the batting 24 and direct them out of the chute 70. The scoop means 118 is located adjacent to the base wall 76, and includes a vertical contacting wall 119. The wall 119 extends upwardly to the horizontal plane defined by the saw 95 and defines an angle of about 135° with the plane defined by the saws 92 and 93. The scoop means 120 is located at the top edge of the side wall 78b, and includes a vertical contacting wall 121. The wall 121 extends downwardly to the level of the horizontal plane defined by the saw 94 and defines an angle of about 135° with the plane defined by the saws 92 and 93. The scoop means 118 and 120 include downwardly inclining scrap discharge chutes 124 and 125, respectively, into which the scrap batting cut by the saws 92, 93, 94 and 95 is directed upon contact with the walls 119 and 121.

After passing the scoop means 118 and 120, the continuously notched, layered batting enters the segmenting station 14 where individual modules are separated from the following layers of batting. The segmenting station 14 includes means for applying a resisting pressure to the incoming, shaped batting, means for separating individual modules of shaped batting and means for rotating and discharging the separated modules for securing.

As the shaped, layered batting enters the segmenting station 14, the leading layer of the batting is contacted and resisted by a vertical plate member 126. The plate 126 is carried by two horizontal guide rods 128 which are slidingly mounted upon the frame 16. The plate 126 is biased with a constant force to a position adjacent the chute 70 by means of a weight 129 connected over a pulley 130 by a cable 132 to the outboard end of a guide rod 128. As the incoming batting pushes against the plate 126, movement is resisted by the weight 129. The degree of resistance, and therefore the degree of compression of the layered batting 24, is easily adjustable by varying the amount of weight carried by the cable 132.

When the desired length of compressed, layered batting has entered the segmenting station 14, as indicated by engagement of the plate 126 with a limit switch 134, for example, an air cylinder 136 is actuated to extend a planar blade 138 across the discharge end 74 of the chute 70 and into contact with a stop surface 140, thus separating a module 142 from the following shaped layeres within the chute 70.

After the module 142 has been separated, the discharge means are activated to remove the separated module from the segmenting station 14. The discharge means includes an air cylinder 144 including an extendible rod 146 having a stroke of about eighteen inches. The rod 146 is attached to an L-shaped push member 148 having a horizontal leg 150 and a vertical leg 152. In the depicted embodiment the leg 152 is about eight inches wide and about eight inches tall and the leg 150 is about eleven inches wide and about seven inches deep. The leg 150 is located at a height of about nine inches above the platform 22.

As the cylinder 144 is actuated and the rod 146 extends outwardly therefrom, the leading edge 154 of the leg 150 first contacts the separated module 142. Because the module 142 is under compression between the plate 126 and the blade 138, when the leading edge 154 engages the module at a level above the midpoint, the module 142 is pivoted about its lower edge. By the time the rod 146 has extended about seven inches, more than the upper half of the module 142 has been completely freed from engagement with the plate 126 and blade 138. The module therefore continues to rotate, falling into the discharge table 156. The lower notched area 159 aids in effecting the rotation. Continued extention of the rod 146 causes the leg 152 to engage the module edge 158 and push the module 142 entirely out of the segmenting station, out of the path of the succeeding module as it is rotated.

After the rod 146 has completed its extension, it is retracted into the cylinder 144. Upon complete retraction, as indicated by contact of the leg 152 with the limit switch 160, for example, the blade 138 is also returned to the home position by retraction of the cylinder 136. The retraction of the push member 148 also releases the plate 126 for return to the discharge end 82 of the chute 70 under the influence of the falling weight 129.

A timer 162 is operatively connected between the limit switch 134, a compressed air source (not shown) and the cylinders 136 and 144 to actuate the cylinder 136 first and, after a delay equivalent to the period required for the blade to complete separation, then actuate the cylinder 144.

The limit switch 160 is also operatively connected to the motor 32 whereby the motor 32 is deactivated when the cylinder 144 is activated to extend the push member 148. In this manner the rollers 26*a* and 26*b* cease feeding batting 24 into the chute 50 while the discharge end 74 of the chute 70 is blocked by the blade 138 and push member 148.

The table 156 onto which the module is discharged comprises a base wall 163 and two upstanding side walls 164 and 166. The side walls 164 and 166 extend to the full height of a module 142 at the segmenting station 14 and taper downwardly to a height equivalent to the distance between the side walls 54*a* and 54*b* of the chute 50. The side walls 164 and 166 are angled relative to one another to define a narrowing channel adapted to compress a module as it is pushed from the segmenting station 14. At the segmenting station 14, the channel is wider than the desired width of the finished module in order to accomodate the expanded upper portion as it is released from compression. However, as the module is progressively urged along the table 156, the side walls 164 and 166 recompress the module to the desired overall dimensions.

The distal end portion of the table 156 includes extensions 165 and 167 of the side walls 164 and 166, respectively, and a support rod 168. When a module is located on the rod 168, between the extensions 165 and 167, a conventional banding machine (not shown) applies a pair of parallel bands 170. Alternatively, a sleeve of nylon mesh, for example, may be applied around the formed module 142.

In operation, a roll of batting 24 is located adjacent the entry end 18 of the apparatus 8 with a vertical axis of rotation. The batting 24 enters the space between and engages the vertical rollers 26*a* and 26*b*. The counter-rotation of the rollers 26*a* and 26*b* feeds the batting 24 to enter the oscillating layering chute 50. The chute 50, which is oscillated in time with the rotation of the rollers 26*a* and 26*b* causes the batting 24 to layer itself in a serpentine manner within the chute 50.

Figure 3:
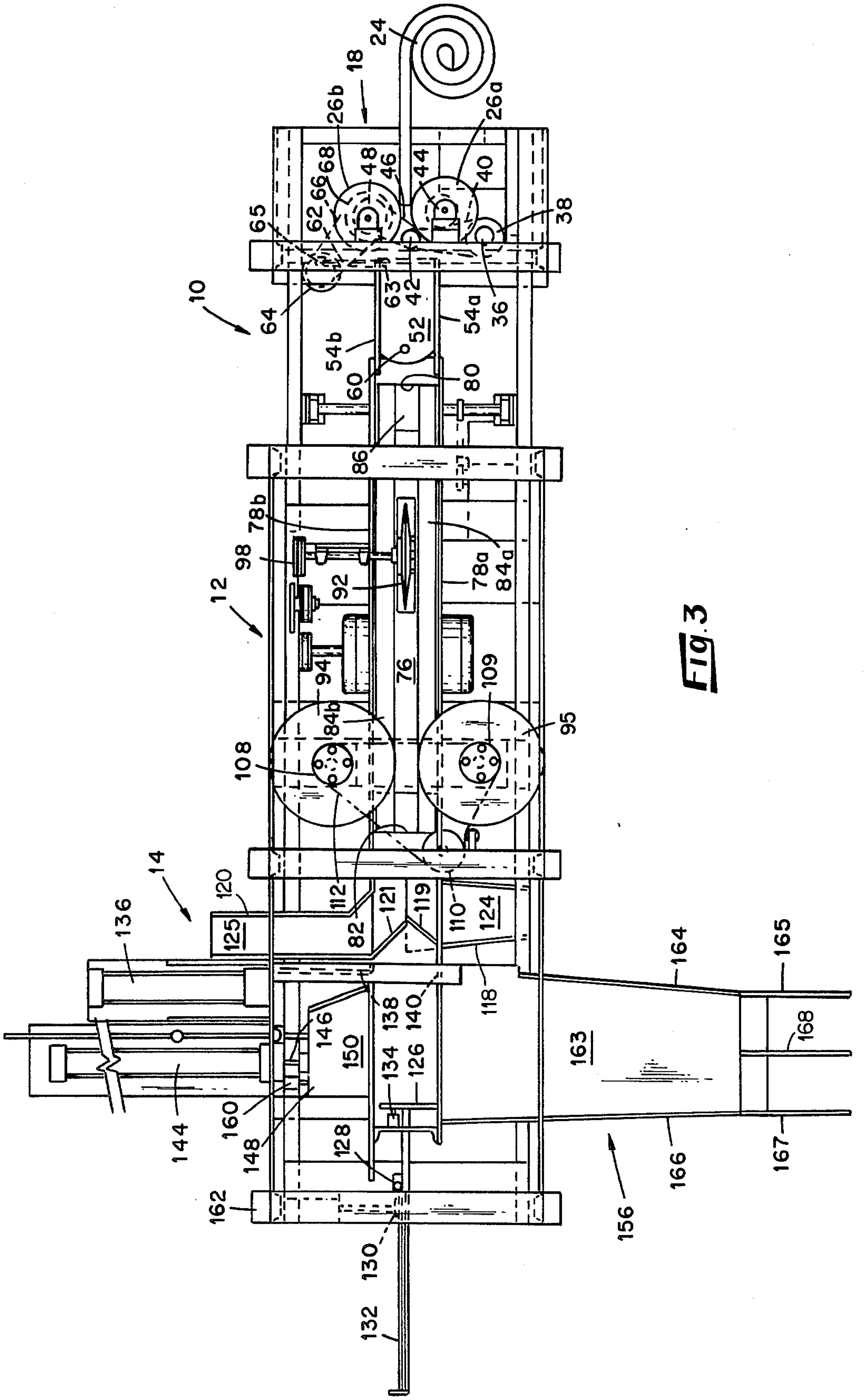
FIG. 3 is a top plan view of the apparatus depicted in FIG. 1.

The continuously layered batting is then carried by the conveyor belts 84*a* and 84*b* past the saws 92 and 93, defining vertical cuts in the layered batting 24. The conveyors 84*a* and 84*b* then carry the layered batting past the saws 94 and 95 defining horizontal cuts in the batting which intersect the vertical cuts. Continued travel within the chute 70 causes the notched scrap meterial, defined by the saws 92, 93, 94 and 95, to contact the scoop walls 119 and 121, which in turn direct the scrap material into scrap discharge chutes 124 and 125. By reference to the foregoing description and, in particular, by reference to FIGS. 1 and 3, and the description of the operation of apparatus 8, it is readily apparent that the batting may be incorrectly cut until the chute 70 is completely loaded with layered batting. Of course, such incorrectly cut material that may be produced initially during start up may be discarded.

The shaped, layered batting is pushed into the segmenting station 14 against the resisting force of the weighted plate 126. When the plate 126 engages the limit switch 134, the air cylinder 136 is actuated, extending the blade 138 through the layered batting and into contact with the stop surface 140, separating an individual module 142 from the following layers. Immediately thereafter, the air cylinder 144 is actuated, extending the leading edge 154 of the push member 148 into contact with the separated module 142, and causing it to lean and fall onto the table 156. Continued extension of the cylinder 144 pushes the discharged module 142 farther along the table 156, out of the path of the next succeeding module 142. The module 142 is also recompressed to its desired dimension as it is pushed along the table 156 by the next succeeding module.

The cylinder 144 is then retracted and the cylinder 136 is retracted, releasing the plate 126 to engage the new leading edge of the shaped, layered batting at the discharge end 74 of the chute 70.

The depicted embodiment is adapted for manufacturing a module of a particular size and shape. However, it will be recognized that by adjustably mounting the saws 92, 93, 94 and 95, notches of varying sizes and shapes are defined in the layered batting. Also, by adjusting the sizes of the chutes 50 and 70 and adjusting the connecting rod 62, and the locations of nips on the rollers **26*a* and 26*b***, modules of varying size and shapes can be manufactured in accordance with the present invention.

While a preferred embodiment of the present invention has been shown and described herein, it is intended to cover all modifications falling within the spirit and scope of the invention as defined in the appended claims.

What is claimed is:

1. A method for manufacturing a plurality of discrete articles having a non-rectangular cross-sectional shape from a web of batting of indeterminate length, said method comprising:

feeding said web into a forming chute to form a plurality of layers of said batting having a total length which is greater than the length of the discrete articles; removing a continuous notch from said plurality of layers to define a non-rectangular cross-sectional shape in said layers; separating a predetermined portion of said notched layeres to define a separated portion and a following portion and securing said layers of said separated portion to define a discrete article.

2. A method as defined in claim 1 wherein said continuous notch is removed by said layered batting past a plurality of cutting members to disengage scrap material from said layered batting and directing said scrap material away from said layered batting prior to separation of said predetermined portion.

3. A method as defined in claim 1 wherein said predetermined portion is separated by inserting a blade between successive layers of said batting and pushing said separated layers out of alignment with said following portion.

4. A method as defined in claim 3 wherein said separated portion is rotated about 90° as it is pushed out of alignment with said following portion.

5. The method of claim 1 wherein said forming chute is oscillated to form serpentine layers of said batting.

6. The method of claim 1 wherein said feeding step is stopped during said separation step.

7. An apparatus for manufacturing a plurality of discrete articles having a non-rectangular cross-sectional shape from a web of batting of indeterminate length, said apparatus comprising a frame having an infeed end and a discharge end, means mounted upon said frame adjacent to said entry end for layering said batting, a shaping chute having an entry end and a discharge end and including means for defining continuous notch means in said layered batting, means for separating a predetermined portion of said notched, layered batting from a following portion of said layered batting and means for discharging said separated portion at said discharge end of said apparatus.

8. The apparatus of claim 7 wherein said layering means comprises a laterally oscillating chute and means for feeding said batting into said oscillating chute.

9. The apparatus of claim 7 wherein said means for defining continuous notch means comprises a plurality of saws extending into said shaping chute to define a plurality of intersecting cuts and sever scrap material from said layered batting.

10. The apparatus of claim 9 wherein said shaping chute further comprises scoop means for removing said scrap material from said shaping chute.

11. The apparatus of claim 7 wherein said separating means comprises a blade and means for selectively extending said blade between adjacent layers of said notched, layered batting.

12. The apparatus of claim 7 wherein said discharging means comprises a push member and means for selectively extending said push member into contact with said separated porition to push said separated portion out of alignment with said following portion.

13. The apparatus of claim 12 wherein said push member is located at a height whereby said separated portion is rotated as it is pushed out of alignment with said following portion.

* * * * *

UNITED STATES PATENT OFFICE

CERTIFICATE OF CORRECTION

Patent No. 4,479,295 Dated October 30, 1984

Inventor(s) Carroll Musick

It is certified that error appears in the above-identified patent and that said Letters Patent are hereby corrected as shown below:

Column 2, line 24, "referring" should be -- Referring --.

Column 3, line 14, "62" should be -- 52 --

Column 3, line 24, "Asthe" should be -- As the --

Column 5, line 46, "the" should be -- this --.

Column 6, line 45, "meterial" should be -- material --.

Column 7, line 39, after "by" insert -- urging --.

Column 8, line 41, "porition" should be -- portion --.

Signed and Sealed this

*Twelfth* Day of *March 1985*

[SEAL]

*Attest:*

DONALD J. QUIGG

*Attesting Officer* *Acting Commissioner of Patents and Trademarks*